United States Patent [19]

Oleson

[11] 4,007,654
[45] Feb. 15, 1977

[54] SAWING APPARATUS OF THE PULPWOOD SLASHER TYPE

[76] Inventor: Sumner R. Oleson, 117 W. Pleasant St., Westbrook, Maine 04092

[22] Filed: Sept. 25, 1975

[21] Appl. No.: 616,674

[52] U.S. Cl. .................................. 83/155; 83/104; 83/165; 83/404.4; 83/425.1
[51] Int. Cl.² .......................................... B27B 7/00
[58] Field of Search ................ 83/407, 404.4, 104, 83/155, 425.1, 425.2, 165

[56] References Cited
UNITED STATES PATENTS

| | | | |
|---|---|---|---|
| 487,947 | 12/1892 | Gateley | 83/404.4 |
| 704,170 | 7/1902 | Batte | 83/404.4 X |
| 832,273 | 10/1906 | Perron | 83/404.4 |
| 1,332,477 | 3/1920 | Sturm | 83/404.4 |
| 3,709,265 | 1/1973 | Tanguay | 83/404.4 X |

Primary Examiner—Frank T. Yost

[57] ABSTRACT

Sawing apparatus, such as a pulpwood slasher, has an upwardly inclined, log-supporting deck provided with means to carry logs of a predetermined maximum length from the lower to the upper end thereof with the logs transversely of the deck. The deck is substantially in the form of a right triangle and its side that corresponds to the hypotenuse thereof has a series of circular saws spaced equally from each other and the ends of that side so that each log, as it is carried by the conveying means, is brought successively into engagement with the saws. The saws have a lead such that when a cut is completed, a wanted length drops onto a takeaway conveyor as it is cut free and the proximate end of the remainder of that log clears that saw as it is conveyed thereby. The takeaway conveyor extends diagonally of the path of logs and the conveying means supporting the log on both sides of each saw while it is being cut.

13 Claims, 9 Drawing Figures

SAWING APPARATUS OF THE PULPWOOD SLASHER TYPE

BACKGROUND REFERENCE

U.S. Pat. No. 704,170

BACKGROUND OF THE INVENTION

Sawing apparatus in accordance with the invention, while adapted for other uses, is herein discussed primarily in connection with use as a pulpwood slasher.

Because of increased labor costs, it is no longer the usual practice to cut pulp in the woods into lengths dimensioned for use at the mills. Increased labor costs have made it more economical to transport to the mill logs of substantial length, sometimes referred to as "tree length" logs, and at the mill, cut such logs into wanted lengths which may be four, six, or eight foot lengths. While this change in procedure was made possible by equipment capable of handling and transporting such tree length logs, it requires equipment at the mill by which such long logs may be cut into predetermined lengths, twenty-four feet for example, and slashers capable of processing large quantities of such tailored logs rapidly into the shorter, wanted lengths in order to ensure the economy of the entire operation.

Pulpwood slashers presently in use are of the type having an upwardly inclined log supporting deck provided with conveyor means to carry the logs from the lower end of the deck to the upper end thereof with the logs transversely of the deck. A series of circular saws is arranged in the form of a V pointed towards the lower end or base of the deck. The saws are supported by the deck and are spaced transversely and lengthwise thereof so that each log is first cut in half and the segments again halved one or more times until the segments are of the wanted length which are all then carried by the conveying means and discharged from the upper end of the deck onto take-away conveyor extending transversely of the path of the logs while being cut.

A problem with such a slasher is that often the means carrying the logs from the lower to the upper end of the deck fail to hold a segment which has been cut free and such a freed segment not infrequently returns towards the lower end of the deck and strikes a saw blade and either dulls it or breaks teeth therefrom. Saw replacements are expensive and the production time, while the apparatus is shut down is substantial.

In U.S. Pat. No. 704,170, sawing apparatus, particularly for use in cutting cord wood logs into desired lengths, is disclosed as having means to convey a log into successive engagements with each of a series of saws but holding each log at but one side thereof. The saws were positioned so that each wanted length would drop from the apparatus when it was cut free. The apparatus was provided with a takeaway conveyor extending in the same direction as the path of the conveyed logs.

THE PRESENT INVENTION

The general objective of the invention is to provide log sawing apparatus of the slasher type adapted to meet the requirements in cutting wood for pulp production.

In accordance with the invention this general objective is attained with a slasher having a log supporting deck held upwardly inclined by supporting structure. The deck is substantially in the form of a right triangle and is provided with a series of circular saws spaced along the side of the deck that corresponds to the hypotenuse of such a triangle. Log conveying means extend upwardly from the lower end or base to the upper end of the deck on both sides of each saw and parallel to the other side of the deck. The saws are so positioned that the distance between each two saws provides the desired length into which the log is to be cut, that a log is in contact with but one saw at a time, and that each log drops from the deck immediately upon being cut free.

Another objective of the invention is to ensure that once a saw completes its cut, not only does the cut end drop from the deck but also the proximate end of the remainder of the log being conveyed is clear of that saw, an objective attained with each saw having a lead, that is, its plane, while vertical, is slightly diagonal with respect to the axis of the log in the direction of that part thereof that is to be conveyed past the saw. To establish such a lead, the arbors of the shafts of each saw are connected to the deck so that the saw-supporting end of each shaft is slightly nearer the lower end or base of the deck than its other end.

Another objective of the invention is to have the deck provide maximum advantages in attaining the wanted relationship between the saws and the log conveying means, an objective attained with a deck construction that provides the saw-supporting side of the deck with a series of uniformly space, laterally disposed steps with each saw between two steps, the steps defining the upper end portions of the deck and the log conveying means trained about the base of the deck and the end portions thereof.

Yet another objective of the invention is to provide a takeaway conveyor for the cut log sections as they drop from the deck, an objective attained with a conveyor extending alongside the saw-supporting side of the deck, diagonally with respect to the path of the conveyed logs and spaced an equal distance from each saw and a further objective is to effect the discharge of the cut log sections onto the takeaway conveyor, an objective attained with each log chute including angularly joined and diagonally inclined walls, one inclined away from the proximate end portion of the deck in the direction of travel of the log conveying means and the other inclined outwardly away from the proximate saw with the junction of the chute walls defining a channel disposed in the direction of travel of the takeaway conveyor.

Another objective of the invention is to provide a deck meeting requirements for the mounting of the saws and the support of and the drive for conveying means and at the same time enabling the deck to be made with modules the width of which can be easily varied during manufacture to establish the desired transverse distance between the saws. In accordance with the invention, this objective is attained with a deck including parallel beams of U-shaped section extending lengthwise of the deck and arranged in series, one series on each side of each saw and of a step-forming length. Each series of beams has an outer pair with their channels opening away from each other and an intermediate pair of interconnected beams with their channels opening towards each other and supporting a first deck member with the spacing between them determining the transverse distance between the proximate saws. Each of the outer pair beams is connected to the proximate one of the intermediate pair below the plane of their flanges to provide a channel, one for each of a pair of conveyors as the log conveying means desirably includes pairs of conveyors, one pair at each side of each saw. The beam of the outer pair that is exposed at the stepped side of the deck supports a saw arbor while the other beam of that pair is connected to the proximate beam of the proximate series and includes a second deck member.

Yet another objective of the invention it to provide a common drive for the several pairs of conveyors of the log conveying means, an objective attained by providing each pair of conveyors with common supporting shafts with that at their outfeed ends provided with a sprocket connected by a chain to a sprocket on a shaft spaced from the proximate saw and under the deck, the shafts are parallel and are connected in at least one series with one of the parallel shafts connected to a prime mover.

BRIEF DESCRIPTION OF THE DRAWINGS

The accompanying drawings illustrate a preferred embodiment of the invention

THE PREFERRED EMBODIMENT OF THE INVENTION

Pulpwood is presently prepared for use by delivering tree-length logs to the mill where they are cut into desired lengths, typically four, six, or eight foot lengths.

The equipment required for carrying out that operation on an efficient basis includes a receiving station, generally indicated at 10, dimensioned to receive and support tree-length logs 11 transversely of its parallel conveyors 12, the width of the station 10 being 60 feet, for example. The conveyors 12 are under the control of an operator in a cab 13 and deliver one or more logs 11 to a transfer 14 which, when operated, discharges its log or logs 11 onto a roller conveyor 15 to be carried lengthwise therealong, when placed in service by the operator, transversely of the infeed end of a log slasher and against a stop 16.

As the usual length of a log 11 is far greater than that for which the slasher is designed, 24 feet for example, a swing saw, generally indicated at 17 is provided adjacent the side of the slasher opposite the stop 16 enabling the operator to cut the logs 11 into 24 foot lengths. The thus tailored logs can then be rolled onto the infeed end of the slasher by means of parallel conveyors 18, also under the control of the operator. A log hoist, generally indicated at 19, is provided for use in unloading trucks and also for feeding jams, if such should occur.

The equipment as thus far described is or may be conventional and for that reason it is shown only schematically in the drawings and will not be further detailed as forming no part of the present invention.

A slasher in accordance with the invention has a deck generally indicated at 20 supported by structure generally indicated at 21 so that it is forwardly and upwardly inclined relative to its lower end or base at an angle of 15°, by way of a preferred example with said lower end positioned to receive logs when the conveyor 18 is actuated to transfer a tailored log from the conveyor 15.

Before detailing the deck 20 or its supporting structure 21, it is noted that the deck is substantially in the form of a right triangle and its side that corresponds to the hypotenuse thereof has a series of parallel circular saws 22 lengthwise thereof an equal distance from each other and the ends of that deck side. Log conveying means consisting of a plurality of pairs or conveyors 23 extend lengthwise of the deck, one pair on each side of each saw 22, are operable to carry a log extending transversely of the deck structure into engagement with the saws 22 whereby wanted lengths are successively cut therefrom and the locations of the saws are such that each such cut length drops, as it is cut free, via a chute 24 onto a forwardly and upwardly inclined takeaway conveyor 25 extending alongside the slasher diagonally with respect to the path of the conveyor 23 and an equal distance from each of the saws 22. By means, subsequently detailed, each saw has a lead such that as a saw completes its cut not only does the cut end drop from the deck 20 but also the proximate end of the remainder of the log clears that saw. The sawdust from each saw 22 is discharged through a chute 26 onto a forwardly and upwardly inclined sawdust conveyor 27 extending below the saws and parallel to the takeaway conveyor 25.

Figure 2:
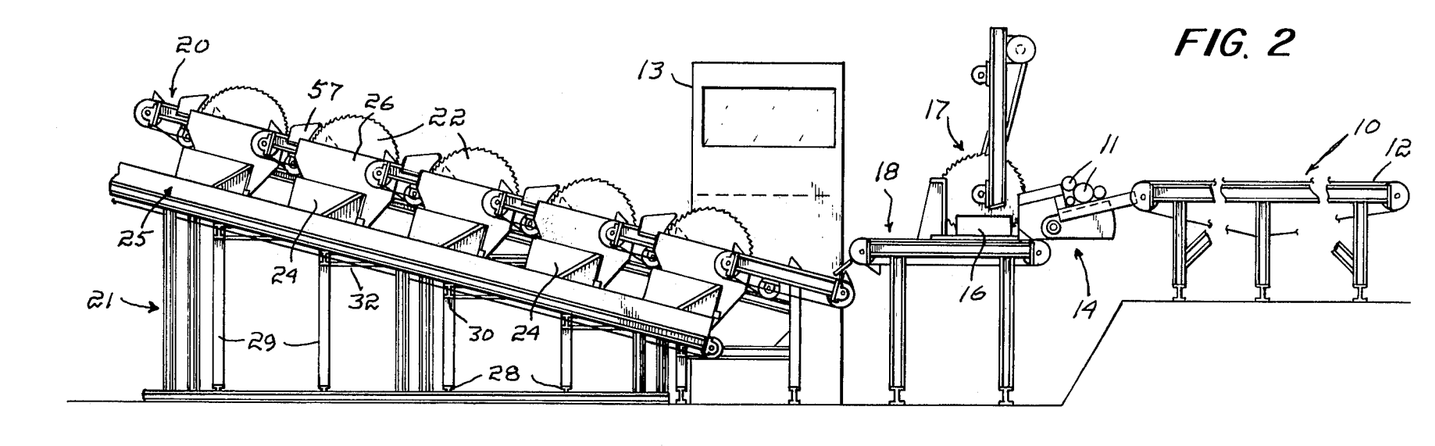
FIG. 2 is a side view of the apparatus shown in FIG. 1, on an increase in scale and also broken away to foreshorten the drawing.
Figure 3:
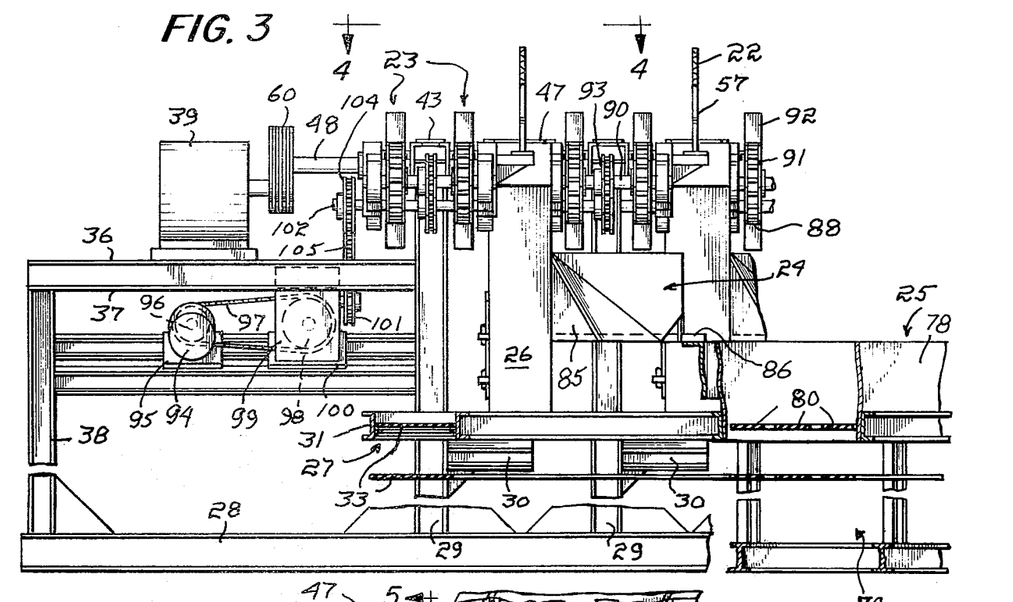
FIG. 3 is a section, on a further increase in scale, taken approximately along the indicated line 3—3 of FIG. 1.

The supporting structure 21 of the slasher, see FIGS. 2 and 3, includes a series of transverse main beams 28 on a suitable base and a series of vertical legs 29 spaced lengthwise of each beam 28 with the legs of successive beams increasing uniformly in length while the length of the beams 28 decreases in length due to the triangular shape of the deck 20 and its wanted inclination.

It will be seen that the legs 29 at the ends of the beams 28 below the saws 22 have laterally extending arms 30 which are located to support the trough 31 of the sawdust conveyor 27 parallel to the deck 20. It will also be noted that each two longitudinally aligned legs 29 are interconnected adjacent their upper ends by bracing beams 32. The sawdust conveyor 27 includes a belt 33 conventionally trained about a roller 34 at its ends with the upper roller 34 driven by a motor 35, see FIG. 1.

At the side of the slasher adjacent the cab 13 there is a platform 36 supported by framework, see FIG. 3, including beams 37 secured to the proximate slasher legs 29 and to legs 38 in support of the other ends of the beams and secured to the ends of the beams 28, and dimensioned to hold the platform 36 below but parallel to the deck 20. The platform 36 supports a series of motors 39, one for each saw.

The deck 20 includes sections that are identical except for their length and, accordingly, their components are identified by the same reference numerals. The length of each section differs from that of the others by an equal distance and they are arranged so that the log supporting side has a series of laterally disposed, equal steps.

Figures 7, 8:
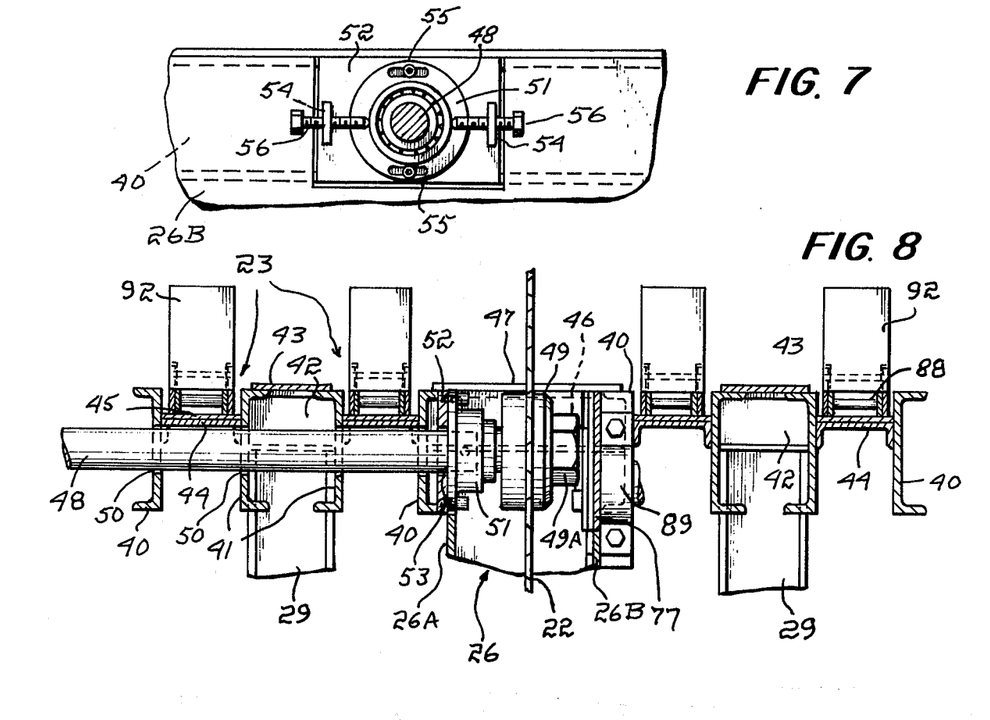
FIG. 7 is a section, taken approximately along the indicated line 7—7 of FIG. 4.
FIG. 8 is a section taken approximately along the indicated line 8—8 of FIG. 4.

Each deck section, see FIG. 8, includes a series of parallel beams of the same length, of U-shaped cross section and extending lengthwise of the deck 20 with an outer pair of beams 40 disposed with their channels opening away from each other and an intermediate pair of beams 41 disposed towards each other. The beams 41 are interconnected by cross braces 42, conveniently I-beams, with their upper flanges supporting a deck member 43 extending their full length and with the I-beams welded to the upper ends of the appropriate legs 29. In manufacturing decks in accordance with the invention, it is the width of the deck members 43 and the length of the I-beam braces 42 that determines the transverse spacing of the saws 22.

Each beam 41 is connected to the proximate beam 40 by a channel member 44 provided with a wear plate 45 and spaced below the flanges of the beams it connects to provide a channel for the appropriate one of the conveyors 23 with which that deck section is provided.

The proximate beams 40 of proximate sections are interconnected by cross braces 46, conveniently I-beams, and support a deck member 47 extending from the lower end of the deck 20 forwardly to overlie the proximate end of the proximate sawdust chute 26 which is supported by the proximate beams 40.

Each saw 22 is conventionally attached to an end of a shaft 48 with the saw holding collar 49 secured by a nut 49A. Each shaft 48 extends freely through holes 50 in the beams between its saw 22 and the platform 36 and is supported by arbors 51, one arbor attached to the beam 40 of each longer deck section that is proximate to the beam 40 of the proximate shorter section beyond but close to the end thereof and the other arbor 51 attached to the beam 40 of the longest deck section that is proximate to the platform 36.

One objective of the invention is to provide that each saw 22 may be so lead that, when it completes a cut, not only will the cut end of a log drop free of the deck 20 but also the proximate end of the log being conveyed past that saw will clear it. To that end, the connection of each arbor 51 to the appropriate one of the beams 40, see FIGS. 7 and 8, includes a mounting plate 52 secured to that beam 40 and provided with a hole 53 freely receiving a shaft 48 and provided with stops 54 spaced apart lengthwise relative to the beams 40 with an arbor 51 between them and connected to the plate 52 as at 58 to permit it to be moved relative thereto lengthwise of said beams. Set screws 56 threaded through the stops 54 engage the arbor 51 to hold it in a selected position so that the saw-supporting end of each shaft 48 is slightly nearer the base of the deck 20 than the other end thereof. As a consequence, each saw 22, while vertical is disposed diagonally relative to the axis of logs being conveyed upwardly along the deck 20 and in a direction away from its saw-supporting side. The plane of each saw therefor departs slightly from a right angular relationship to the axes of the logs by 1° or 2° by way of example and not by way of limitation. A saw protector 57 is bolted to supports 58 at the end of each saw-supporting beam 40, see FIGS. 4 and 5, and as shown in FIG. 4 each shorter deck section terminates close to but short of the axis of the proximate saw 22.

The other end of each shaft 48 is provided with a pulley 59 connected by a belt drive 60 to the drive pulley 61 of the appropriate one of the motors 39.

Figure 4:
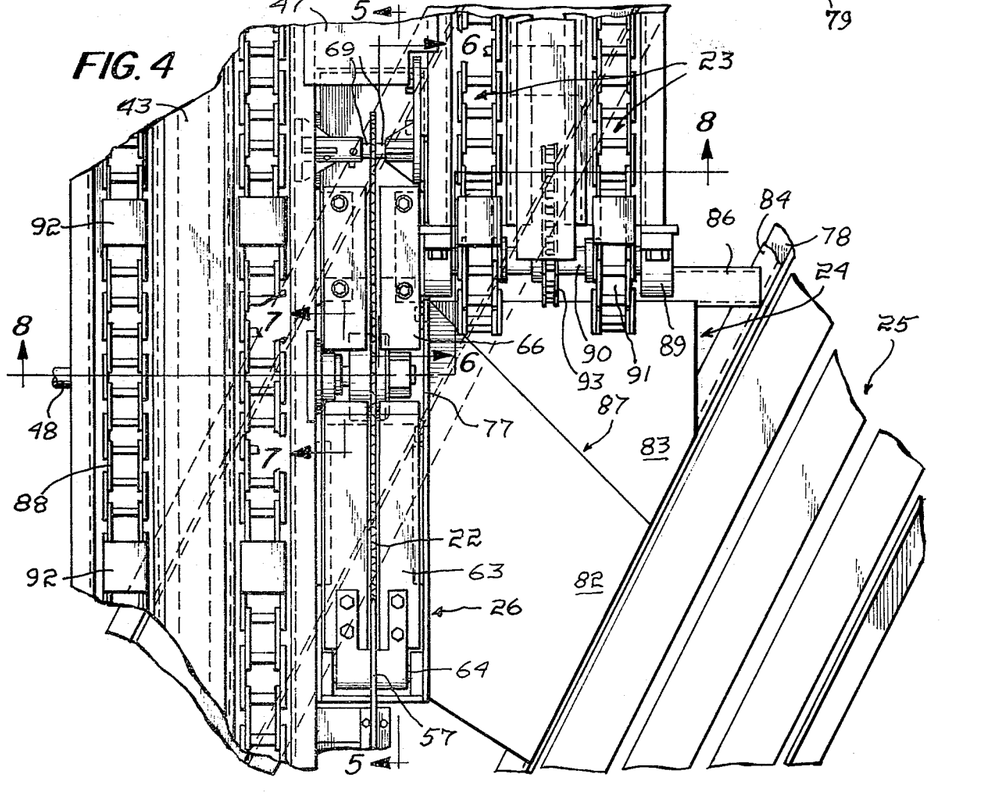
FIG. 4 is a section on a further increase in scale and take approximately along the indicated line 4—4 of FIG. 3.
Figure 5:
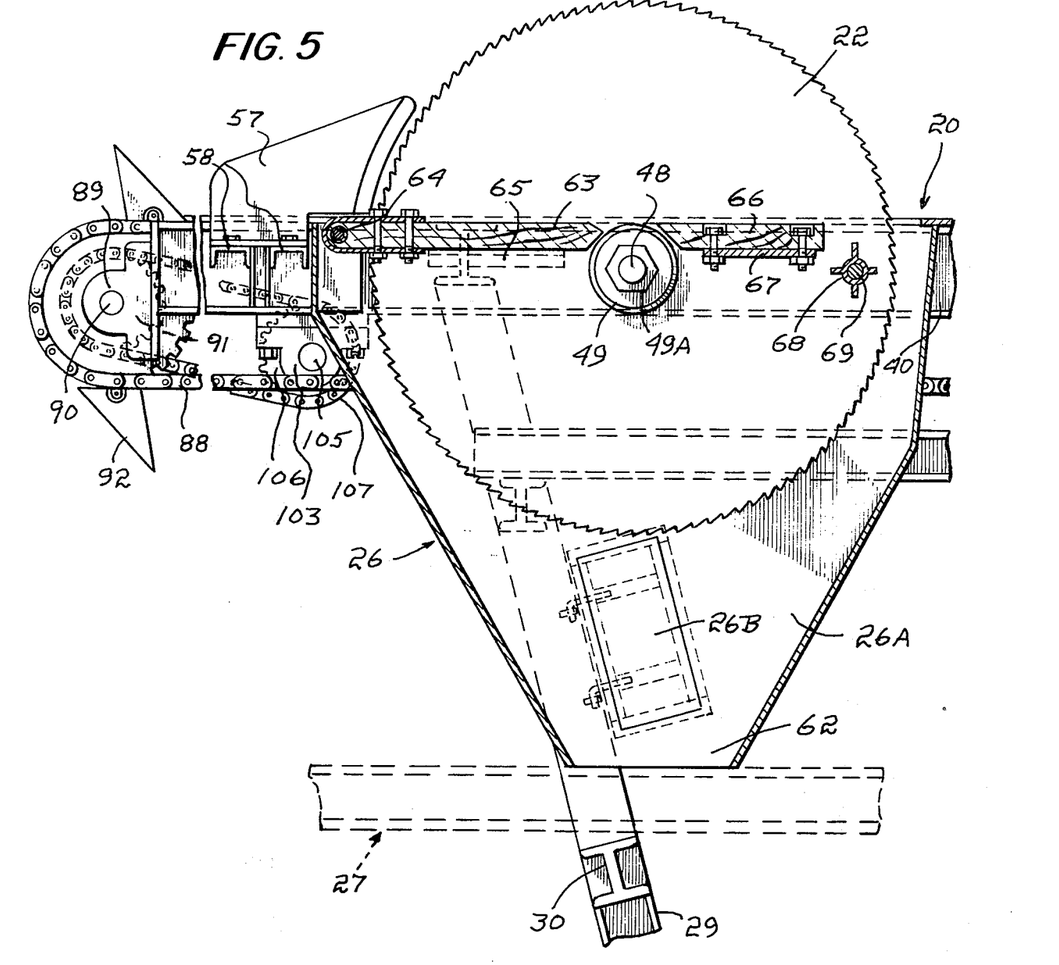
FIG. 5 is a section, taken approximately along the indicated line of 5—5 of the FIG. 4.
Figure 6:
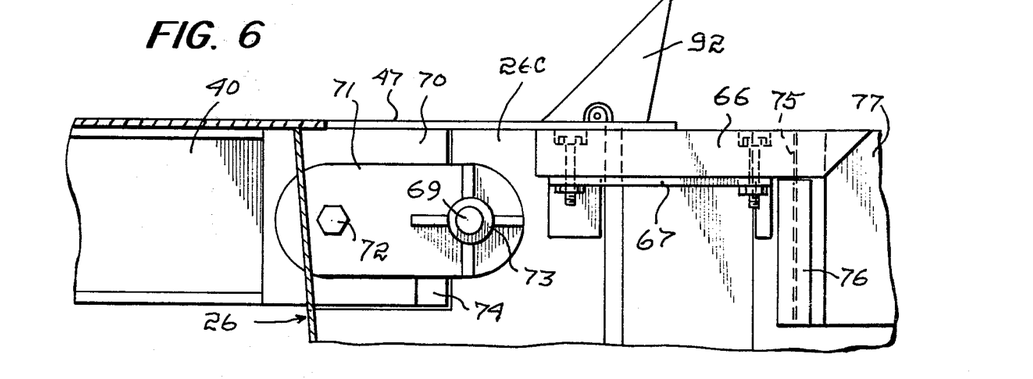
FIG. 6 is a section, taken approximately along the indicated line 6—6 of FIG. 4.

Each sawdust chute 26, see FIGS. 4, 5, and 6, has an elongated, rectangular upper end with a side wall 26A attached to a frame member 40 and cut away to accommodate a mounting plate 52 and an arbor 51. The end walls of the chutes 26 are inclined towards each other to establish an outlet 62 dimensioned and positioned appropriately for the trough 31 of the sawdust conveyor 27 adjacent which the wall 26A has a clear-out door 26B. At its upper end, each chute 26 has a saw board 63 pivotally connected to its outer end as at 64 and resting on stops 65. At its other end, there are a pair of saw boards 66 bolted to shoulders 67. The chute wall 26A is cut away to accomodate the fixed holder 68 for one saw guide pin 69 which holder is bolted to the beam 40 to which the sawdust chute 26 is attached. The opposite sawdust chute wall 26C is cut away to accommodate a base 70 fixed on the opposite frame member 40 and having an arm 71 pivotally connected thereto as at 72 and provided at its free end with a holder 74 for the other saw guide pin 69, the arm 71 normally resting on a stop 74. The chute wall 26C is also cut away as at 75, see FIG. 6, in front of the nut 49A with its margins provided with vertical guides 76 by which a vertically slidable door 77 is releasably held.

Figure 1:
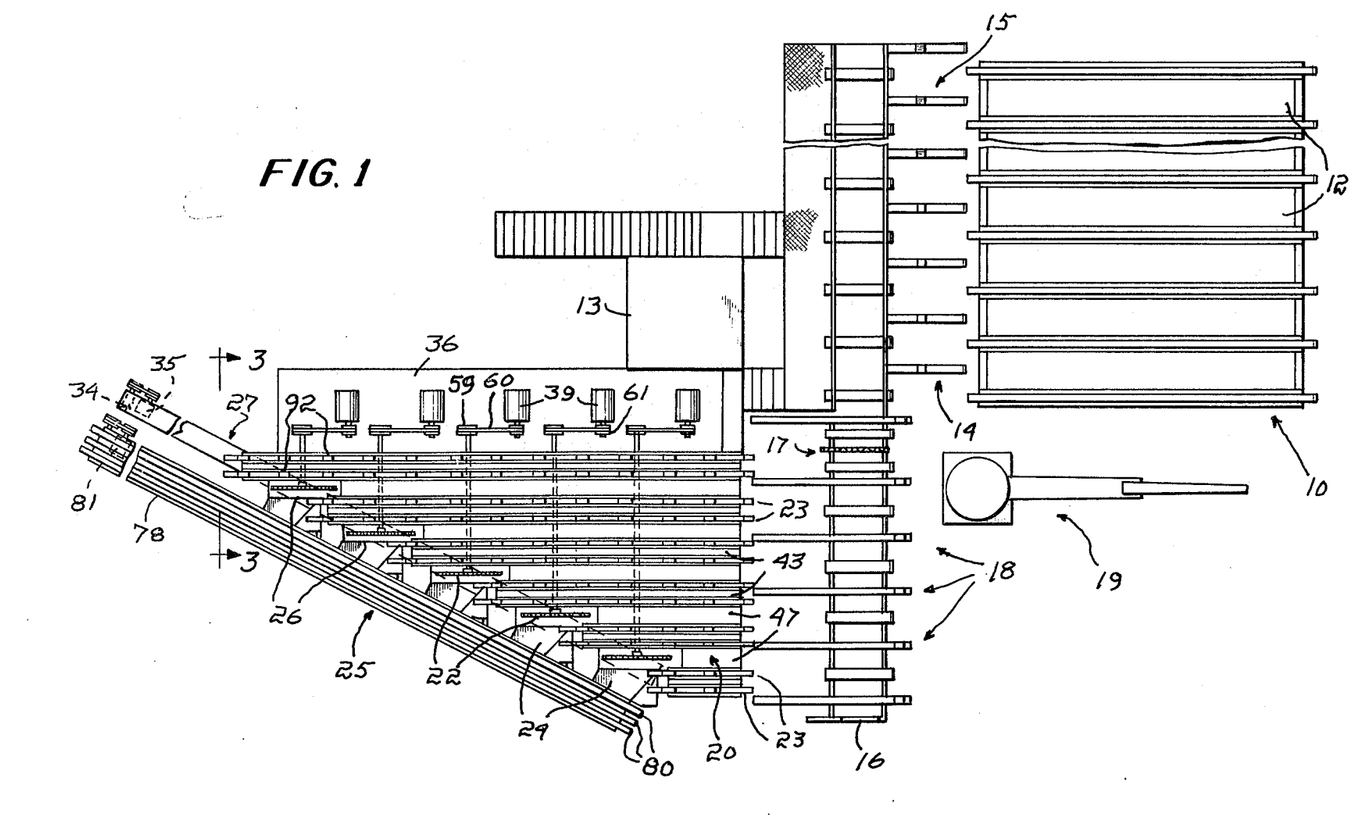
FIG. 1 is a somewhat schematic view of a log slasher in accordance with the invention and the means for feeding logs thereto when tailored to lengths appropriate for the slasher.

The takeaway conveyor 25 like the sawdust conveyor 27 is or may be conventional except for its position and is not detailed other than to note that it includes a trough 78 held by framework 79 parallel to the slasher deck 20 but extending beyond the end thereof to a selected discharge area, see FIG. 1. The conveyor includes a series of endless members 8 driven 80 an electric motor 81 and the members 80 may be belts or chains depending on the wanted rate of travel.

Each log chute 24, see FIGS. 3 and 4, has angularly joined side walls 82 and 83, respectively. Each wall 82 is anchored to a sawdust chute wall 26C and to a beam 84 extending lengthwise of the proximate wall of the trough 78 of the takeaway conveyor 25 and secured thereto to which the wall 83 is also anchored. Each wall 83 includes a brace 85 secured to a beam 86 connected to a leg 29 and to the beam 84. The wall 82 is inclined downwardly and outwardly away from the proximate saw 22 and the wall 83 is inclined downwardly and forwardly in the direction of travel of the takeaway conveyor 25. The chute is thus V-shaped with the junction of its walls defining a channel 87 inclined in the direction of travel of the takeaway conveyor 25 thus to insure that the log sections, as they are cut free, will be disposed lengthwise in the trough 78.

Turning now to the conveyors 23 and their drive, each of the conveyors of each pair includes, see FIGS. 3, 4, and 5, a chain 88 and at the ends of the beams 40 of each deck section there are bearing units 89 in support of shafts 90 provided with sprockets 91 about which the chains 88 are trained. Each chain 88 has a series of log engaging lugs 92 pivotally connected thereto with the lugs of all the conveyors 23 transversely aligned. Each of the shafts 90 in support of the upper ends of said pairs of conveyors 23 has a sprocket 93 between its sprocket 91.

Figure 9:
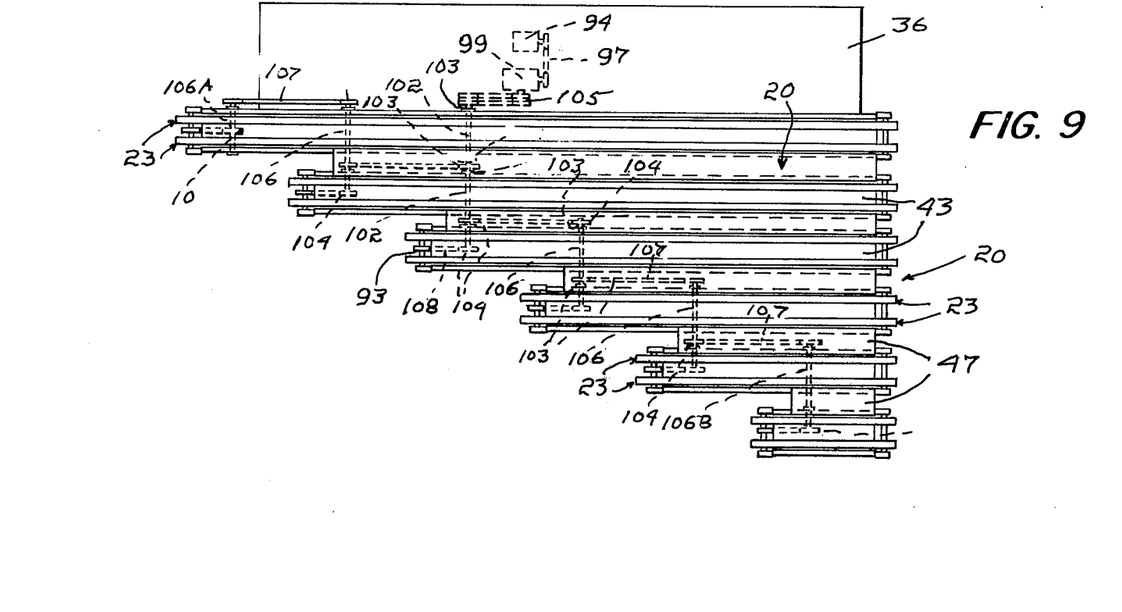
FIG. 9 is a plan view of the deck showing the drive for the log conveying means and with the saws and their drives omitted.

A motor 94, see FIGS. 3 and 9, mounted on a support 95 below the platform 36 has its drive pulley 96 connected by belts 97 to the drive pulley 98 of a speed reducer 99 mounted on a support 100. A drive shaft 102 is rotatably supported by bearings 103 mounted on the undersurface of beams 40 and is provided with end and two intermediate sprockets 104 wth one end sprocket 104 connected by a chain 105 to the sprocket 101 of the speed reducer 99.

A series of parallel shafts 106 provided with sprockets 104 are rotatably supported by bearings 103 or the undersurface of beams 40, the uppermost or first shaft 106A somewhat shorter than the other shafts of said series with the beams 40 being those of the first deck section next to the motor 94, the second shaft 105 supported by beams 40 of the first and second deck sections, the third shaft 106 by the beams 40 of the third and fourth sections, the fourth shaft 106 supported by the beams 40 of the fourth and fifth sections, and the lowermost or fifth shaft 106B by the beams 40 of the fifth and sixth sections. With the exception of the shaft 106A, the other shafts of the parallel series are of the same length. Sprockets 104 of the second and third shafts 106 are connected by chains 107 to appropriate ones of the sprockets 104 of the shaft 102, the sprocket 104 of the first shaft 106A and the second shaft 106 are connected by chains 107 and sprockets 104 of the fourth shaft 106 are connected to appropriate ones of the sprockets 104 of the third ad fifth shafts by chains 107 and it will be noted that all the chains 107 are of the same length. Another sprocket 104 of each of the series of parallel shafts is connected to the appropriate one of the sprockets 93 by a chain 108, the chains 108 all of the same length.

It will be appreciated from the foregoing, that all the conveyors 23 are driven at the same rate and transverse alignment of the log engaging lug 92 is positively maintained.

We claim:

1. A slasher for cutting logs into lengths suitable for use as pulpwood, said slasher including a log-supporting deck and structure supporting said deck in a upwardly inclined position, said deck substantially in the form of a right triangle, a series of parallel circular saws spaced along the upwardly inclined side of the deck that corresponds to the hypotenuse of said triangle, conveying means extending from the lower to the upper end of the deck parallel to the other upwardly inclined side thereof and operable to support a log transversely of the deck and carry that log into engagement with the saws, said saws being so positioned that the distance between each two saws provides the desired length into which the conveyed log is to be cut, that a log is in contact with only one saw at a time, and that each length being cut protrudes from said first named side, and said conveying means includes courses holding each log on both sides of each saw as said log is being cut thereby, the course supporting the protruding end thereof terminating in such relation to the proximate saw as to permit each cut length to drop from the deck immediately upon being cut free.

2. The slasher of claim 1 and a takeaway conveyor extending alongside the series of saws spaced equally therefrom, and substantially parallel to said hypotenuse.

3. The slasher of claim 2 and a sawdust conveyor parallel to said takeaway conveyor and extending under each saw.

4. The slasher of claim 1 and means rotatably supporting each saw with its plane diagonal with respect to the axis of the logs carried by the conveying means to an extent such that when a saw completes a cut the proximate end of that part of the log still being conveyed clears that saw.

5. The slasher of claim 4 in which each saw includes a shaft, and the saw supporting means are connected to the deck for movement lengthwise thereof to enable the shafts to be positioned with their saw supporting ends nearer to the lower end of the deck than their other ends.

6. The slasher of claim 4 in which the deck includes a series of parallel lengthwise beams, each saw includes a shaft extending freely through said beams, and a pair of arbors, one adjacent each end thereof, mounting plates are fixed on the beams adjacent said shaft ends, means adjustably connect each arbor to a mounting plate for movement lengthwise relative to the beams, each plate includes a pair of stops between which an arbor is located, and each stop includes a set screw in engagement with said arbor, said set screw operable to hold that arbor against such lengthwise movement.

7. A slasher for cutting logs into lengths suitable for use as pulpwood, said slasher including a log supporting deck and structure supporting said deck in an upwardly inclined position, said deck substantially in the form of a right triangle with its side corresponding to the hypotenuse thereof including a series of uniformly spaced, laterally disposed steps each defining an upper end portion of the deck structure, a series of circular saws rotatably supported by said deck, one saw between each two steps, a drive and endless conveying means supported by said deck structure and including log conveying courses extending from the base thereof along both sides of each saw with their upper ends trained about said upper end portions, a drive for said conveying means, said conveying means operable to carry a log transversely of the base of said deck structure upwardly into successive engagement with said saws, the conveying means at the outer side of each saw terminating sufficiently close to the axis thereof to ensure the support of the proximate end of a log until the end portion thereof is cut free, then to drop from the deck structure via the space forwardly of the proximate step.

8. The slasher of claim 7 and an upwardly inclined takeaway conveyor extending alongside but below said end portions, and the slasher includes a log chute for each saw disposed to receive a sawed-off length and discharge it on said takeaway conveyor, each chute including angularly joined and downwardly inclined walls connected to said conveyor, one inclined away from the proximate end portion in the direction of travel of the log carrying means and the other inclined away from the plane of the proximate saw, the junction of said walls defining a channel disposed outwardly and forwardly in the direction of travel of the takeaway conveyor.

9. The slasher of claim 8 in which the takeaway conveyor is disposed diagonally with respect to the paths of the log conveying means and uniformly spaced from the saws and the log chutes all have the same dimensions.

10. The slasher of claim 9 in which there is a series of sawdust chutes attached to the deck structure, one for each saw and receiving the lower part thereof within it, an upwardly inclined sawdust conveyor extends under the sawdust chutes parallel to the takeaway conveyor, the width of said sawdust conveyor less than the length of the sawdust chutes, each sawdust chute having an outlet dimensioned and disposed to ensure the discharge of sawdust on the sawdust conveyor.

11. The slasher of claim 7 in which the deck includes parallel beams of U-shaped section arranged in series, one series on each side of each saw and of a step-forming length, each series including a pair of outer beams disposed with their channels opening away from each other and a pair of intermediate beams disposed with their channels opening towards each other, means including a deck member interconnecting the beams of the intermediate pair, means interconnecting each beam of the outer pair to the proximate beam of the intermediate pair below the plane of the deck member thereby to provide channels lengthwise of the deck, two for each series, the log conveying means includes a plurality of pairs of conveyors to which the drive therefor is common, one for each channel, and the drive includes a prime mover and a series of parallel shafts, one for each pair of conveyors and means connecting each parallel shaft to the appropriate one of said parallel shafts to the prime mover, and chain and sprocket means connecting said parallel shafts one to the other in at least one series, and the supporting structure includes a series of vertical beams in support of the intermediate pair of beams and varying in length to provide the desired slope of the deck, and means including a second deck member connecting the proximate ones of the outer beams of the shorter and longer sections and means rotatably supporting each saw and connected to that one of the outer beams of the longer series that is proximate to the shorter series.

12. The slasher of claim 11 in which the shaft connected to the prime mover is an intermediate one of the parallel shafts and the other parallel shafts are connected by said chain and sprocket means to said intermediate shaft in two series with the chains of the connecting means all of the same length.

13. The slasher of claim 11 in which the infeed and outfeed supporting shafts are mounted at the ends of the outer pair of beams of each series, the outfeed supporting shafts the drive shafts and each including a sprocket between the intermediate pair of beams thereof, and each of the parallel shafts is supported below the deck by beams on both sides of the proximate saw and includes a sprocket below and between the intermediate pair of beams, and a chain interconnects that sprocket to the appropriate ones of the drive shaft sprockets.

* * * * *